(12) United States Patent
Friend

(10) Patent No.: US 9,483,563 B2
(45) Date of Patent: Nov. 1, 2016

(54) LINK MANAGEMENT SYSTEM AND PROCESS FOR DYNAMICALLY UPDATING BACKLINKING AND NON-BACKLINKING SEO CRITERIA PROFILES

(71) Applicant: Dorianne Marie Friend, Ione, CA (US)

(72) Inventor: Dorianne Marie Friend, Ione, CA (US)

( * ) Notice: Subject to any disclaimer, the term of this patent is extended or adjusted under 35 U.S.C. 154(b) by 302 days.

(21) Appl. No.: 14/327,424

(22) Filed: Jul. 9, 2014

(65) Prior Publication Data

US 2015/0019521 A1  Jan. 15, 2015

Related U.S. Application Data

(60) Provisional application No. 61/844,675, filed on Jul. 10, 2013.

(51) Int. Cl.
*G06F 17/30* (2006.01)

(52) U.S. Cl.
CPC ..... *G06F 17/30864* (2013.01); *G06F 17/3089* (2013.01)

(58) Field of Classification Search
CPC ............... G06F 17/30864; G06F 17/3089
See application file for complete search history.

(56) References Cited

U.S. PATENT DOCUMENTS

2012/0246134 A1*  9/2012  Yu ................. G06F 17/30899
707/706

* cited by examiner

*Primary Examiner* — William Spieler
(74) *Attorney, Agent, or Firm* — Plager Schack LLP

(57) ABSTRACT

Some embodiments include a novel link management system and process in which a webmaster of a website responds to a change in a backlink algorithm of a search engine by performing an update operation to each of a set of backlinks that appear on another website and that reference back to the website. In some embodiments, the update operation is a change operation that modifies the backlink on the other website. In some embodiments, the update operation is a delete operation that removes the backlink from the other website.

10 Claims, 3 Drawing Sheets

LINK MANAGEMENT SYSTEM AND PROCESS FOR DYNAMICALLY UPDATING BACKLINKING AND NON-BACKLINKING SEO CRITERIA PROFILES

CLAIM OF BENEFIT TO PRIOR APPLICATION

This application claims benefit to U.S. Provisional Patent Application 61/844,675, entitled "IMPROVED METHOD FOR DYNAMICALLY UPDATING BACKLINKING AND NON-BACKLINKING SEO CRITERIA PROFILES," filed Jul. 10, 2013. The U.S. Provisional Patent Application 61/844,675 is incorporated herein by reference.

BACKGROUND

Embodiments herein relate generally to updating URL linking, and more particularly to dynamically updating web page and SEO profile linking in response to changes in the search rules used by web-based search engines.

Web-based search engines frequently change the rules used to perform searches. In particular, search engines often change the backlink algorithm which often results in harm to a webmaster's positions in search result rankings Changes to the backlink algorithm are costly to deal with and time-consuming to resolve. Such changes contribute to financial loss for an organization grappling with the changes and/or professional service organizations hired by an organization to promote or emphasize a website in the search of any or all search engines. One such professional organization is a search engine optimizer (SEO). An SEO is typically hired by an organization to improve the overall position of a website in the order of search results retrieved by a search engine.

Typically, a webmaster needs to resolve one or more existing backlinks in light of the new, updated backlink algorithm. This involves the webmaster of website A contacting the webmaster of external website B, which contains a backlink to website A, and asking the webmaster of website B to change or remove the backlink to website A. This is problematic for webmasters who control websites associated with a lot of backlinks because the webmaster will end up having to contact each of the external webmasters individually and request the change or removal.

Thus, what is needed is a mechanism that will let the webmaster of website A change or delete links instantly without needing to contact the webmasters of external websites that contain backlinks to website A.

BRIEF DESCRIPTION

Embodiments of the invention include a novel link management system and a novel process for dynamically updating backlinking and non-backlinking SEO criteria profiles. In some embodiments, the link management system enables a user to take full control over link density of websites associated with the user. In some embodiments, the link management system enables users to take full control over link density of an SEO profile of the user. In some embodiments, the link density quantifies each of link anchor and link type.

The preceding Summary is intended to serve as a brief introduction to some embodiments of the invention. It is not meant to be an introduction or overview of all inventive subject matter disclosed in this specification. The Detailed Description that follows and the Drawings that are referred to in the Detailed Description will further describe the embodiments described in the Summary as well as other embodiments. Accordingly, to understand all the embodiments described by this document, a full review of the Summary, Detailed Description, and Drawings is needed. Moreover, the claimed subject matters are not to be limited by the illustrative details in the Summary, Detailed Description, and Drawings, but rather are to be defined by the appended claims, because the claimed subject matter can be embodied in other specific forms without departing from the spirit of the subject matter.

BRIEF DESCRIPTION OF THE DRAWINGS

Having described the invention in general terms, reference is now made to the accompanying drawings, which are not necessarily drawn to scale, and wherein.

DETAILED DESCRIPTION

In the following detailed description of the invention, numerous details, examples, and embodiments of the invention are described. However, it will be clear and apparent to one skilled in the art that the invention is not limited to the embodiments set forth and that the invention can be adapted for any of several applications.

Embodiments of the invention include a novel link management system and a novel process for dynamically updating backlinking and non-backlinking SEO criteria profiles. In some embodiments, the link management system enables a user to take full control over link density of websites associated with the user. In some embodiments, the link management system enables users to take full control over link density of an SEO profile of the user. In some embodiments, the link density quantifies each of link anchor and link type.

I. Link Management System

As stated above, search engines frequently change their backlink algorithm, which often harms a webmaster's positions in search rankings, and thereby contributes to financial loss. Embodiments of the invention claimed here solve this problem. Specifically, some embodiments of the invention enable webmasters to control, change, or delete a backlink profile of a website or SEO profile through a single interface to match and follow changes by the search engines to regain rankings Examples of search engines include Google, Bing, Dog Pile, and Duck Duck Go, among many others.

In general, some embodiments of the link management system work by a dynamically controlled linking process that enables users to take full control over their websites' or SEO profile link density (anchor and type) from a single unified management point regardless of link location. In some embodiments, the unified management point is a dashboard application running on a computing device accessed by the webmaster. In some embodiments, operation of the dynamically controlled linking is based on a script (i.e., a set of programming codes) that each campaign (or sub-campaign set) gets assigned, and where the webmaster places the script instead of an embedded or displayed link on websites anywhere on the Internet or within the SEO profile.

When the page is accessed (e.g., called up or spidered), link information is pulled from the webmasters campaign settings dashboard thus letting the user control the link density of the campaign. The user can then change link density or take links totally down.

In some embodiments, each keyword field can take multiple keywords. If multiple are given, the program will post sequentially recurring. Program has ability to add more keyword fields. At any time the user changes the percentage, program acts accordingly so all links going through the PHP pulling system will reflect %. Furthermore, for tracking the program reports link placement, link type, and tier. Assigned values are made to different types of linking and thus sort them in list.

Figure 1:
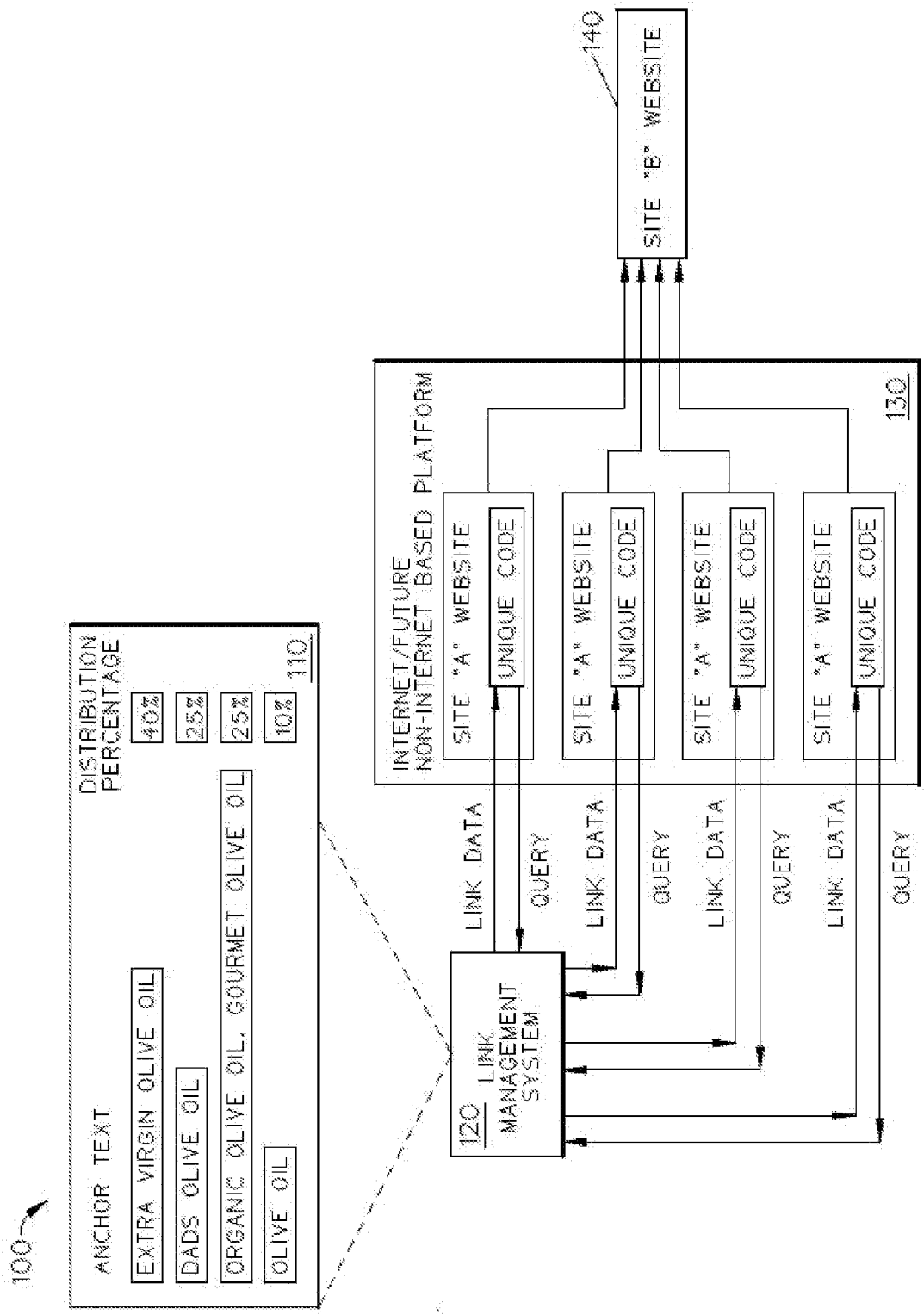
FIG. 1 conceptually illustrates a schematic view of a link management system that dynamically updates backlinking and non-backlinking SEO criteria profiles in some embodiments.

By way of example, FIG. 1 conceptually illustrates a schematic view 100 of dynamic updating of backlinking and non-backlinking SEO criteria profiles by a link management system 120 in some embodiments. As shown in this figure, a dashboard 110 provides anchor text in multiple sets of user-entered keywords and provides associated percentages of backlink coverage for each set of keywords. In this example, the dashboard provides a first set of keywords including "EXTRA", "VIRGIN", "OLIVE", and "OIL"; a second set of keywords including "DADS", "OLIVE", and "OIL"; a third set of keywords including a first sub-group with "ORGANIC", "OLIVE", "OIL", and a second sub-group with "GOURMET", "OLIVE" and "OIL"; and a fourth set of keywords including "OLIVE" and "OIL". The percentages are shown for each set, namely, 40% coverage for the first set of keywords, 25% coverage for the second set of keywords, 25% coverage for the third set of keywords, and 10% coverage for the fourth set of keywords.

As shown, the anchor text and coverage distribution percentages are fed to the link management system 120. There, the link management system updates site "A" website of an Internet platform 130 with multiple sets of unique code (i.e., a scripts) to perform the link management in response to any change of backlink algorithm by a search engine, and then provides the same update script and/or unique code from each site "A" website to site "B" website 140 with backlinks to each of the site "A" websites.

To date, there has not been a system to dynamically control a webmasters backlink profile. As mentioned, the current state of affairs involves webmasters doing the work by hand. However, changing or deleting backlinks is a time consuming process that most webmasters are not willing to do, or do not have the time to do, for the webmaster of a different website. The webmaster who successfully convinces other external webmasters to change or delete the backlinks still needs to laboriously contact each webmaster individually (e.g., by phone, by email, etc.). Even under ideal conditions (e.g., you are able to reach each webmaster by phone directly) the time involved can get unmanageable when there are many external websites with such backlinks. The same scenarios similarly daunts SEOs with SEO profiles.

II. Process for Dynamically Updating Backlinking and Non-Backlinking
SEO Criteria Profiles In some embodiments, the process updates backlinks in response to changes in backlink algorithms used by search engine. Specifically, the process performs operations in which a webmaster of a website or an SEO of an SEO profile responds to a change in a backlink algorithm of a search engine by performing an update operation to each of a set of backlinks that appear on another website and that reference back to the website. In some embodiments, the update operation is a change operation that modifies the backlink on the other website. In some embodiments, the update operation is a delete operation that removes the backlink from the other website.

Embodiments of the invention described in this specification improve upon the existing mechanisms for (manually) updating and/or changing backlinks to a website. Because there is currently no system to dynamically control a webmaster's backlink profile, some embodiments that dynamically change or delete backlinks overcome the intensive labor and time lag involved in doing so manually, as currently is the norm. Any SEO would appreciate the time savings because it is not uncommon for search engines to change their backlink algorithm often and/or to change the backlink algorithm in ways that are designed to de-emphasize search results of websites that are promoted by SEOs.

In some embodiments, the process involves a number of steps for a user to dynamically change or delete backlinks to a particular website, the steps being at least:
1. Enter User Dashboard
2. Enter Backlink Anchor text (Keywords)
3. Enter percentage of backlink coverage for above
4. Entry Type of backlink
5. Program creates script for user to put in place of a backlink on site A sites.
6. User puts script in places where there would like backlinks
7. User can change keywords or percentages at any time
8. Script changes backlinks according to users input In Step 1, the user dashboard is part of a graphical user interface (GUI) of a software program. The GUI is displayed on a display device and allows the user to interact with the software program by way of a set of dashboard controls for backlink management. As a person skilled in the art can appreciate, any type of computing interface (i.e., GUI window, apps, widgets, etc.) could be used instead of the user dashboard. However implemented, in some embodiments, the user dashboard is a central location for the user to perform backlink control and distribution. The remaining steps involve user (i.e., a website webmaster) actions for dynamically changing and/or deleting backlinks on external sites.

Figure 2:
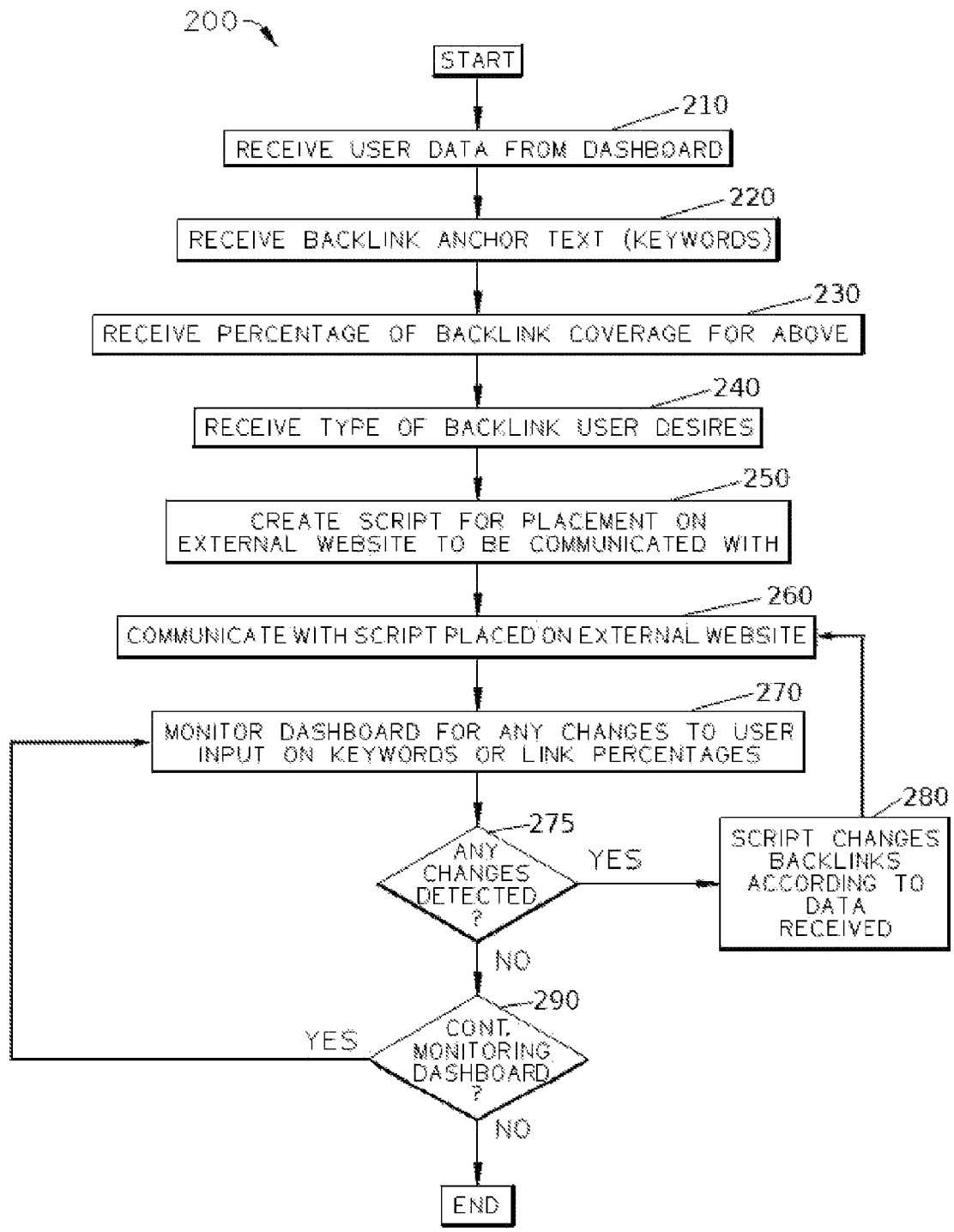
FIG. 2 conceptually illustrates a process for dynamically updating backlinking and non-backlinking SEO criteria profiles in some embodiments.

In some embodiments, a corresponding process is performed by the software program when the software program is running on a processor of a computing device. The steps include include:
1. Receiving user data from the dashboard
2. Receiving backlink anchor text (i.e., keywords)
3. Receiving a percentage of backlink coverage for the backlink anchor text
4. Receiving the type of backlink the user desires
5. Creating a script for placement on an external website with which communication is anticipated
6. Communicating with the script placed on the external website
7. Monitoring (listening for) dashboard activity for any changes to user input on keywords or link percentages
8. Determining whether any changes have occurred By way of example, FIG. 2 conceptually illustrates a process 200 for dynamically updating backlinking and non-backlinking SEO criteria profiles in some embodiments. In some embodiments, the process is performed by the software application. As shown in this figure, the process 200 starts when the user begins interacting with the link management system 120 by way of the dashboard 110. First the process 200 receives (at 210) user data from the dashboard. Then the process receives (at 220) backlink anchor text (e.g., keywords). The process also receives (at 230) the percentages of backlink coverage for each set of anchor text keywords. Additionally, the process receives (at 240) a type of backlink that the user desires.

Once the data is received from the dashboard, the process 200 next creates (at 250) a script for placement on an external website to be communicated with. Then the process communicates (at 260) with the script placed on the external websites. The process next begins to monitor (at 270) the dashboard for any changes to user input on keywords or link percentages. The process of some embodiments listens for changes or events that are triggered by the dashboard when the user changes keywords and/or percentages. In some embodiments, the process determines (at 275) whether any changes have been detected. When one or more changes are detected, the process transitions to 280 in which the script changes backlinks according to the data received. The process then transitions back to 260 to communicate with the script placed on the external websites, as described above.

On the other hand, if the process 200 determines (at 275) that no changes have been detected, then the process transitions to 290. The process at this step determines (at 290) whether to continue monitoring the dashboard or not. When the process 200 determines that continued monitoring of the dashboard is needed, the process transitions back to 270 to monitor the dashboard, as was described above. On the other hand, if the process need not monitor the dashboard any longer, the process then ends.

Some of the steps of the process relate to script-based processing and indicate how the user can change or delete backlinks with a script. Such script-based control provides a convenient method for changing backlink profiles from one centralized location. In some embodiments, the script can be generated by the software application. Thus, when a search engine changes its backlink algorithm, the webmaster can change the profile accordingly by changing settings in their dashboard.

The key improvement is that a script is created that pulls information from user's campaign settings and the website webmaster then places the script (i.e., a series of computer instructions) on websites that they want a link on. So instead of placing the link, they place the code.

The code then pulls information from the user's settings thus letting them control ALL of their linking over the Internet in one central location. In some embodiments, the central dashboard includes additional programming code which must occur to make the code that goes on the websites all over the Internet display the user's preferences in link density (anchor percentage and link type and placement).

In some embodiments, webmaster customization is possible. For example, a user may say, I want x amount of links that say x on x type of sites in x position. To make this invention, one must design and architect software that is able to be opened in a web browser. However, the process is not tied to a web-browser process, but can be part of a stand-alone or client-server application.

In addition, the concepts and ideas in whole and/or in part cover alternative embodiments for changing any type of backlink profile. Besides websites, backlinks could be in PDFs, Text files, and may not even be "online" on the Internet, yet can cover anywhere the search engine obtains information for their algorithm. Moreover, embodiments of the invention may change and/or update other items, besides backlinks, used by SEOs. Examples of such other items include sound, video, mentions, citations, tags, labels, images, bookmarks, and social media postings of websites (which do not include the backlink). Furthermore, the ideas and concepts can apply to changing anything dynamically to change website SEO profile.

The above-described embodiments of the invention are presented for purposes of illustration and not of limitation.

III. Electronic System

Many of the above-described features and applications are implemented as software processes that are specified as a set of instructions recorded on a computer readable storage medium (also referred to as computer readable medium or machine readable medium). When these instructions are executed by one or more processing unit(s) (e.g., one or more processors), they cause the processing unit(s) to perform the actions indicated in the instructions. Examples of computer readable media include, but are not limited to, CD-ROMs, flash drives, RAM chips, hard drives, EPROMs, EEPROMs, etc. The computer readable media does not include carrier waves and electronic signals passing wirelessly or over wired connections.

In this specification, the term "software" is meant to include firmware residing in read-only memory or applications stored in magnetic storage, which can be read into memory for processing by a processor. Also, in some embodiments, multiple software inventions can be implemented as sub-parts of a larger program while remaining distinct software inventions. In some embodiments, multiple software inventions can also be implemented as separate programs. Finally, any combination of separate programs that together implement a software invention described here is within the scope of the invention. In some embodiments, the software programs, when installed to operate on one or more electronic systems, define one or more specific machine implementations that execute and perform the operations of the software programs.

Figure 3:
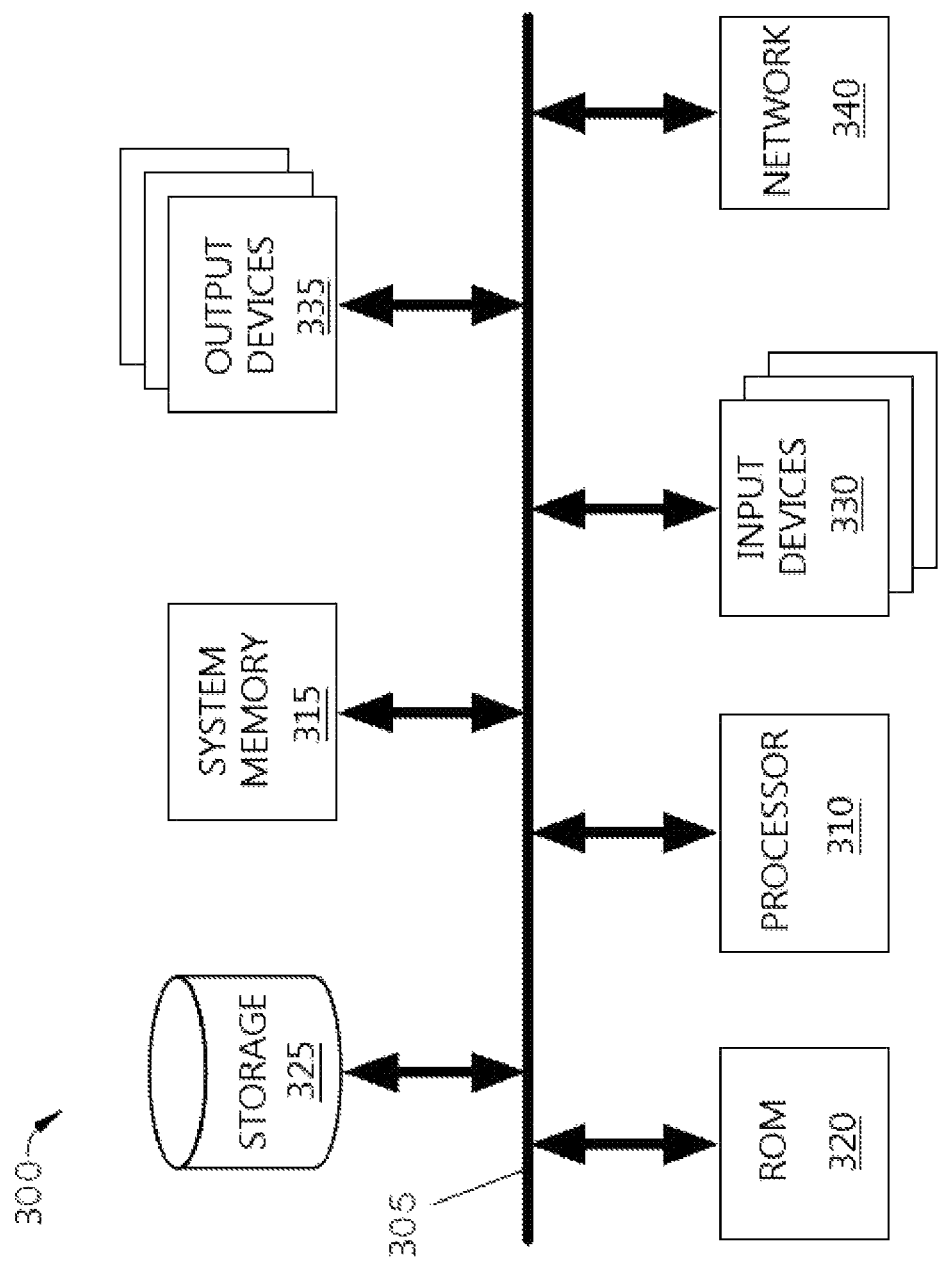
FIG. 3 conceptually illustrates an electronic system with which some embodiments of the invention are implemented.

FIG. 3 conceptually illustrates an electronic system 300 with which some embodiments of the invention are implemented. The electronic system 300 may be a computing device, such as a desktop computer, a laptop computer, a tablet computing device, a portable hand-held computing device, a portable communications devices (such as a mobile phone), a personal digital assistant (PDA) computing device, or any other sort of electronic device. Such an electronic system includes various types of computer readable media and interfaces for various other types of computer readable media. Electronic system 300 includes a bus 305, processing unit(s) 310, a system memory 315, a read-only 320, a permanent storage device 325, input devices 330, output devices 335, and a network 340.

The bus 305 collectively represents all system, peripheral, and chipset buses that communicatively connect the numerous internal devices of the electronic system 300. For instance, the bus 305 communicatively connects the processing unit(s) 310 with the read-only 320, the system memory 315, and the permanent storage device 325.

From these various memory units, the processing unit(s) 310 retrieves instructions to execute and data to process in order to execute the processes of the invention. The processing unit(s) may be a single processor or a multi-core processor in different embodiments.

The read-only-memory (ROM) 320 stores static data and instructions that are needed by the processing unit(s) 310 and other modules of the electronic system. The permanent storage device 325, on the other hand, is a read-and-write memory device. This device is a non-volatile memory unit that stores instructions and data even when the electronic system 300 is off. Some embodiments of the invention use a mass-storage device (such as a magnetic or optical disk and its corresponding disk drive) as the permanent storage device 325.

Other embodiments use a removable storage device (such as a floppy disk or a flash drive) as the permanent storage device 325. Like the permanent storage device 325, the system memory 315 is a read-and-write memory device. However, unlike storage device 325, the system memory 315 is a volatile read-and-write memory, such as a random access memory. The system memory 315 stores some of the instructions and data that the processor needs at runtime. In some embodiments, the invention's processes are stored in the system memory 315, the permanent storage device 325, and/or the read-only 320. For example, the various memory units include instructions for processing appearance alterations of displayable characters in accordance with some embodiments. From these various memory units, the processing unit(s) 310 retrieves instructions to execute and data to process in order to execute the processes of some embodiments.

The bus 305 also connects to the input and output devices 330 and 335. The input devices enable the user to communicate information and select commands to the electronic system. The input devices 330 include alphanumeric keyboards and pointing devices (also called "cursor control devices"). The output devices 335 display images generated by the electronic system 300. The output devices 335 include printers and display devices, such as cathode ray tubes (CRT) or liquid crystal displays (LCD). Some embodiments include devices such as a touchscreen that functions as both input and output devices.

Finally, as shown in FIG. 3, bus 305 also couples electronic system 300 to a network 340 through a network adapter (not shown). In this manner, the computer can be a part of a network of computers (such as a local area network ("LAN"), a wide area network ("WAN"), or an Intranet), or a network of networks (such as the Internet). Any or all components of electronic system 300 may be used in conjunction with the invention.

The functions described above can be implemented in digital electronic circuitry, in computer software, firmware or hardware. The techniques can be implemented using one or more computer program products. Programmable processors and computers can be packaged or included in mobile devices. The processes and logic flows may be performed by one or more programmable processors and by one or more set of programmable logic circuitry. General and special purpose computing and storage devices can be interconnected through communication networks.

Some embodiments include electronic components, such as microprocessors, storage and memory that store computer program instructions in a machine-readable or computer-readable medium (alternatively referred to as computer-readable storage media, machine-readable media, or machine-readable storage media). Some examples of such computer-readable media include RAM, ROM, read-only compact discs (CD-ROM), recordable compact discs (CD-R), rewritable compact discs (CD-RW), read-only digital versatile discs (e.g., DVD-ROM, dual-layer DVD-ROM), a variety of recordable/rewritable DVDs (e.g., DVD-RAM, DVD-RW, DVD+RW, etc.), flash memory (e.g., SD cards, mini-SD cards, micro-SD cards, etc.), magnetic and/or solid state hard drives, read-only and recordable Blu-Ray® discs, ultra density optical discs, any other optical or magnetic media, and floppy disks. The computer-readable media may store a computer program that is executable by at least one processing unit and includes sets of instructions for performing various operations. Examples of computer programs or computer code include machine code, such as is produced by a compiler, and files including higher-level code that are executed by a computer, an electronic component, or a microprocessor using an interpreter.

While the invention has been described with reference to numerous specific details, one of ordinary skill in the art will recognize that the invention can be embodied in other specific forms without departing from the spirit of the invention. For example, a process is conceptually illustrated in FIG. 2. The specific operations of this process may not be performed in the exact order shown and described. Specific operations may not be performed in one continuous series of operations, and different specific operations may be performed in different embodiments. Furthermore, the process could be implemented using several sub-processes, or as part of larger macro processes. Thus, one of ordinary skill in the art would understand that the invention is not to be limited by the foregoing illustrative details and examples, but rather is to be defined by the appended claims.

I claim:

1. A non-transitory computer readable medium storing a backlink control program which, when executed by at least one processing unit of a computing device, provides backlink-related data to a link management system to dynamically update backlinks on one or more websites in response to a change in a backlink algorithm used by a search engine to rank a set of search results, said backlink control program comprising sets of instructions for:

receiving anchor text comprising a set of keywords;

receiving a percentage of backlink coverage for the anchor text;

receiving a type of backlink to perform one or more of an update and a change;

transmitting the anchor text, the percentage of backlink coverage, and the type of backlink to the backlink management system to create a script for placement at an external website in place of each backlink in a set of backlinks corresponding to the backlink type on the external website, said script dynamically changing each backlink in the set of backlinks when the search engine changes the backlink algorithm; and automatically updating one or more websites in response to changes by the search engine.

2. The non-transitory computer readable medium of claim 1, wherein the backlink control program is a user dashboard that allows a user to interface with the backlink management system.

3. The non-transitory computer readable medium of claim 1, wherein the backlink control program triggers an event notification when at least one of the anchor text is changed for at least one keyword in the set of keywords and the percentage of backlink coverage is changed.

4. The non-transitory computer readable medium of claim 3, wherein the event notification is communicated to the script for the script to change backlinks according to each change.

5. A non-transitory computer readable medium storing a backlink management program which, when executed by at least one processing unit of a computing device, dynamically updates backlinks on one or more websites in response to a change in a backlink algorithm used by a search engine to rank a set of search results, said backlink management program comprising sets of instructions for:

receiving, from a user dashboard, a set of backlink-related data comprising a set of anchor text keywords, a set of percentages representing percentages of backlink coverage for the set of anchor text keywords, and a type of backlink;

creating a script for placement at an external website in place of each backlink in a set of backlinks corresponding to the type of backlink on the external website, said script dynamically changing each backlink in the set of backlinks when the search engine changes the backlink algorithm;

monitoring the user dashboard for any changes to user input on any keyword in the set of anchor text keywords and any percentage in the set of percentages;

detecting a change to the user input; and transmitting the detected change to the script placed on the external website in order for the script to automatically update backlinks according to the detected change.

6. The non-transitory computer readable medium of claim 5, wherein the set of instructions for creating the script comprises sets of instructions for:

identifying a set of backlinks that correspond to the backlink type; and placing the script at each backlink in the set of identified backlinks on the external website.

7. The non-transitory computer readable medium of claim 5, wherein the set of instructions for creating the script for placement at the external website comprises a set of instructions for placing the created script at the external website.

8. The non-transitory computer readable medium of claim 7, wherein the set of instructions for placing the created script at the external website comprises a set of instructions for placing the script at each external website in a plurality of external websites.

9. The non-transitory computer readable medium of claim 8, wherein a first external website comprises a first set of backlinks and a second external website comprises a second set of backlinks.

10. The non-transitory computer readable medium of claim 9, wherein the script is placed at each backlink in the first set of backlinks of the first external website and at each backlink in the second set of backlinks of the second external website.

* * * * *